(12) United States Patent
Matthews et al.

(10) Patent No.: US 9,434,641 B2
(45) Date of Patent: Sep. 6, 2016

(54) METHOD FOR PROTECTING GLASS SURFACE USING LONG-CHAIN ORGANIC MATERIAL

(75) Inventors: James Robert Matthews, Painted Post, NY (US); Louis Joseph Stempin, Jr., Corning, NY (US); Wanda Janina Walczak, Big Flats, NY (US); Liming Wang, Painted Post, NY (US); Ruchirej Yongsunthon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 758 days.

(21) Appl. No.: 13/303,655

(22) Filed: Nov. 23, 2011

(65) Prior Publication Data

US 2012/0132053 A1 May 31, 2012

Related U.S. Application Data

(60) Provisional application No. 61/417,603, filed on Nov. 29, 2010.

(51) Int. Cl.
| | |
|---|---|
| *C03C 17/32* | (2006.01) |
| *C03C 17/00* | (2006.01) |
| *C03C 17/28* | (2006.01) |
| *B24B 9/10* | (2006.01) |

(52) U.S. Cl.
CPC ............. *C03C 17/32* (2013.01); *B24B 9/10* (2013.01); *C03C 17/001* (2013.01); *C03C 17/28* (2013.01); *C03C 2203/50* (2013.01); *C03C 2218/355* (2013.01); *Y10T 83/0333* (2015.04)

(58) Field of Classification Search
None
See application file for complete search history.

(56) References Cited

U.S. PATENT DOCUMENTS

| | | | | |
|---|---|---|---|---|
| 5,910,360 A | * | 6/1999 | Boumera et al. | ............. 428/341 |
| 5,997,943 A | * | 12/1999 | Azzopardi et al. | ........... 427/167 |
| 6,379,746 B1 | * | 4/2002 | Birch et al. | .................... 427/154 |
| 6,715,316 B2 | * | 4/2004 | He et al. | ............................ 65/23 |
| 7,108,889 B2 | * | 9/2006 | Bohland | ....................... 427/154 |
| 8,304,083 B2 | * | 11/2012 | Hoshi et al. | ................... 428/429 |
| 2006/0007552 A1 | | 1/2006 | Takakuwa et al. | |
| 2010/0297392 A1 | * | 11/2010 | Chen et al. | ................... 428/141 |
| 2011/0143064 A1 | | 6/2011 | Da Silva et al. | |

FOREIGN PATENT DOCUMENTS

| | | | |
|---|---|---|---|
| DE | 4103283 | 4/1999 | |
| JP | 2008289967 A | 12/2008 | |
| JP | 2011190039 | 9/2011 | ............. B65G 40/06 |
| WO | 2011118502 | 9/2011 | |

OTHER PUBLICATIONS

Fagerholm. "Modification of industrial E glass fibres by long chain alcohol adsorption", Colloids and Surfaces A: Physicochemical and Engineering Aspects 110, (1996), 11-22.
"The boundary lubrication of glass glass contacts by mixed alkyl-alcohol and cationic surfactant systems" M. J. Adams, B. J. Briscoe, D. M. Gorman, F. Hollway, and S. A. Johnson in Lubrication at the Frontier, 1999, ed. D. Dawson et al., pp. 49-58.
"The influence of thermal treatment of controlled porous glasses (CPG) on the properties of n-octadecanol films" A. L. Dawidowicz and J. Rayss, Zeitshcrift fuer Physikalische Chemie, V. 266, (1985), 1210-1218.
"The influence of boron atoms introduced on the silica gel surface upon the properties of n-octadecanol films" A. L. Dawidowicz, J. Rayss, and K. Surowiec, Zeitshcrift fuer Physikalische Chemie, V. 267, (1986), 401-411.

\* cited by examiner

*Primary Examiner* — William Phillip Fletcher, III
(74) *Attorney, Agent, or Firm* — Matthew J. Mason; Stephen Wentsler

(57) ABSTRACT

A method for protecting a sheet surface by forming a discontinuous layer of a long-chain organic material having a main carbon chain comprising at least 12 carbon atoms and a hydrophilic group at one end of the main chain on the sheet surface. The protective layer is easy to remove using standard cleaning method, while providing satisfactory surface protection against particle contamination and scratches, at a very low coating thickness. The invention is particularly useful for protecting glass sheet surfaces during glass sheet finishing such as edge grinding and polishing. The invention is especially useful for the finishing and packaging of LCD glass substrates.

19 Claims, 4 Drawing Sheets

METHOD FOR PROTECTING GLASS SURFACE USING LONG-CHAIN ORGANIC MATERIAL

CROSS-REFERENCE TO RELATED APPLICATION

This application claims the benefit of priority under 35 U.S.C. §119 of U.S. Provisional Application Ser. No. 61/417,603 filed on Nov. 29, 2010, the content of which is relied upon and incorporated herein by reference in its entirety.

TECHNICAL FIELD

The present invention relates in general to glass sheet finishing and packaging. In particular, the present invention relates to glass sheet surface protection during glass finishing and packaging. The present invention is useful, e.g., in the finishing, packaging and transportation of a glass sheet useful for optoelectronic devices such as LCD displays.

BACKGROUND

Fusion down-draw is a leading technology developed by Corning Incorporated, Corning, N.Y., U.S.A. for making thin, precision glass sheets suitable for use as liquid crystal display (LCD) glass substrates and in other opto-electronic devices. In this process, a stream of molten glass is introduced into a forming trough called isopipe having two side surfaces converging at a line called root via an inlet pipe coupled to the trough of the isopipe. The glass melt is allowed to flow over both top surfaces of the trough side walls of the isopipe called weirs, down along both side surfaces of the isopipe as two molten glass ribbons, and then join and fuse at the root to form a single glass ribbon, which is then drawn down and cooled below the root to form the glass sheet with desired dimension. In the zone below the root, the glass ribbon travels substantially vertically downward while being drawn and cooled from a viscous state, to visco-elastic and eventually to substantially elastic. The elastic glass ribbon is then cut into individual glass sheets, subjected to further finishing such as edge rounding and polishing, and then packaged and shipped to LCD panel makers for use as TFT or color filter substrates. Cutting of the glass ribbon at below the isopipe typically involves the scoring of the ribbon surface, followed by bending along the score-line, whereby discrete glass sheets are separated from the ribbon and then transferred to subsequent steps.

One of the advantages of the fusion down-draw process for making glass sheets is that the surface quality of the glass sheets is high because the quality areas thereof were formed in an atmosphere and never touched a solid material such as the forming equipment. This process has been used successfully for making glass sheets having a width as large as 3000 mm and a thickness of about 0.6 mm.

During cutting and separation of the glass sheet at the bottom of the draw, and during the glass finishing steps such as bead removal, edge chamfering and polishing, a number of glass particles are generated. The glass particles can scratch the glass surfaces, or adhere to the glass surface, which may or may not be removed in a later washing and cleaning step. Any glass particles remaining on the glass surface can cause scratches during the packaging and transportation of the sheet if sheet stacking is required. In addition, during sheet packaging and transportation, additional particles may come into contact with the glass surface, which may reduce the surface quality if insufficient protection is available.

Historical means for protecting LCD glass surfaces include the use of paper, plastic films, coatings such as polysaccharides, surfactants, and the like. However, they suffer from various drawbacks.

Therefore, there remains a need of a method for protecting the surface of glass sheets for which a pristine surface is required during finishing, packaging and transportation. The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

Thus, a first aspect of the present invention is directed to a method of handling a sheet material having a substantially clean sheet surface comprising the following steps:

(I) forming a discontinuous layer of a long-chain organic material having a main carbon chain comprising at least 12 carbon atoms and a hydrophilic group in proximity to one of the ends of the main chain on the clean surface; and (II) exposing the sheet surface bearing the long-chain organic material to a plurality of traveling particles without scratching the sheet surface.

In certain embodiments of the first aspect of the present invention, the sheet material is an inorganic material selected from glass, glass-ceramic, ceramic, crystals or combination thereof.

In certain embodiments of the first aspect of the present invention, the substantially clean sheet surface of the sheet material is hydrophilic.

In certain embodiments of the first aspect of the present invention, in step (I), the organic material has as main carbon chain comprising a hydrophilic group at one of the ends of the main chain.

In certain embodiments of the first aspect of the present invention, in step (I), the organic material has a main carbon chain comprising a hydrophilic group selected from a hydroxyl and a carboxyl group.

In certain embodiments of the first aspect of the present invention, in step (I), the organic material has a main carbon chain comprising at most 40 carbon atoms, in certain embodiments at most 30 carbon atoms, in certain embodiments at most 28 carbon atoms, in certain embodiments at most 26 carbon atoms, in certain embodiments at most 24 carbon atoms, in certain other embodiments at most 22 carbon atoms.

In certain embodiments of the first aspect of the present invention, in step (I), the organic material is selected from C18-OH, C18-COOH and mixtures thereof.

In certain embodiments of the first aspect of the present invention, the density of the long-chain organic material at the end of step (I) is from 20 $ng \cdot cm^{-2}$ to 160 $ng \cdot cm^{-2}$, in certain embodiments from 30 $ng \cdot cm^{-2}$ to 150 $ng \cdot cm^{-2}$, in certain embodiments from 45 $ng \cdot cm^{-2}$ to 140 $ng \cdot cm^{-2}$, in certain embodiments from 40 ng·cm$^{-2}$ to 120 ng·cm$^{-2}$, in certain embodiments from 40 ng·cm$^{-2}$ to 100 ng·cm$^{-2}$.

In certain embodiments of the first aspect of the present invention, the average thickness of the layer of the long-chain organic material at the end of step (I) is at most 10 nm, in certain embodiments at most 8 nm, in certain other embodiments at most 6 nm, in certain other embodiments at most 4 nm.

In certain embodiments of the first aspect of the present invention, the average thickness of the layer of the long-chain organic material on the clean surface is at most three times of the length of the main carbon chain.

In certain embodiments of the first aspect of the present invention, the molecules of the long-chain organic material forms a substantially mono-layer structure.

In certain embodiments of the first aspect of the present invention, the molecules of the long-chain organic material form a plurality of discontinuous islets on the clean surface.

In certain embodiments of the first aspect of the present invention, the islets are distributed substantially uniformly on the clean surface.

In certain embodiments of the first aspect of the present invention, the islets are separated by non-coated bare surface area of the clean surface.

In certain embodiments of the first aspect of the present invention, the average distance between adjacent islets on the clean surface is from 0.1 µm to 3 µm, in certain embodiments from 0.2 µm to 2.5 µm, in certain embodiments from 0.3 µm to 2.0 µm, in certain embodiments from 0.4 µm to 2.0 µm, in certain embodiments from 0.5 µm to 1.5 µm, in certain embodiments from 0.6 µm to 1.5 µm, in certain other embodiments from 1.0 µm to 1.5 µm.

In certain embodiments of the first aspect of the present invention, step (II) comprises:

(II.1) grinding an edge of the sheet material.

In certain embodiments of the first aspect of the present invention, step (II) further comprises:

(II.2) applying water to the edge of the sheet material.

In certain embodiments of the first aspect of the present invention, step (II) comprises:

(II.3) scribing part of the clean surface of the sheet material to form a score-line; and (II.4) separating a part of the sheet material along the score-line from the sheet material.

In certain embodiments of the first aspect of the present invention, at the end of step (I), the sheet surface bearing the long-chain organic material exhibits a water contact angle of from 12° to 50°, in certain embodiments from 12° to 45°, in certain embodiments from 15° to 40°, in certain embodiments from 20° to 40°.

In certain embodiments of the first aspect of the present invention, at the end of step (I), the sheet surface bearing the long-chain organic material exhibits a reduction of adhesion force as measured by AFM of from 20% to 70%, in certain embodiments from 25% to 60%, in certain embodiments from 30% to 50%, in certain other embodiments from 30% to 40%.

In certain embodiments of the first aspect of the present invention, the method further comprises the following step (III):

(III) washing the sheet surface to obtain a substantially clean sheet surface free of scratches.

In certain embodiments of the first aspect of the present invention, in step (III), a cleaning agent of Semiclean KG is used.

In certain embodiments of the first aspect of the present invention, at the end of step (III), the sheet surface exhibits a water contact angle of from 0° to 10°, in certain embodiments form 0° to 8°, in certain embodiments form 0° to 6°, in certain embodiments form 0° to 5°.

In certain embodiments of the first aspect of the present invention, step (I) comprises:

(I.1) providing a gas stream comprising the long-chain organic material; and (I.2) contacting the gas stream with the sheet surface for a sufficient period of time to effect the forming of the layer of the long-chain organic material.

In certain embodiments of the first aspect of the present invention, step (I.1) comprises:

(I.1.1) forming a liquid comprising the long-chain organic material; and (I.1.2) passing a carrier gas stream through the liquid or in the vicinity of the surface of the liquid to load the gas stream with the long-chain organic material.

In certain embodiments of the first aspect of the present invention, in step (I), the temperature of the sheet material is maintained below the melting point of the long-chain organic material.

In certain embodiments of the first aspect of the present invention, in step (I), the organic material has a main carbon chain comprising at most 40 carbon atoms, in certain embodiments at most 30 carbon atoms, in certain embodiments at most 28 carbon atoms, in certain embodiments at most 26 carbon atoms, in certain embodiments at most 24 carbon atoms, in certain other embodiments at most 22 carbon atoms, and the temperature of the sheet material is maintained at below 55° C., in certain embodiments below 50° C., in certain embodiments below 40° C.

In certain embodiments of the first aspect of the present invention, in step (I.2), the gas stream has a temperature higher than the melting point of the long-chain organic material, but below the flash point of the long-chain organic material.

In certain embodiments of the first aspect of the present invention, in step (I.1.1), the temperature of the liquid is higher than the melting point of the long-chain organic material, but below the flash point of the long-chain organic material.

In certain embodiments of the first aspect of the present invention, in step (I.1.1), the temperature of the liquid is at least 10° C. higher than the melting point of the long-chain organic material, in certain embodiments at least 20° C. higher than the melting point of the long-chain organic material; in certain other embodiments at least 30° C. higher than the melting point of the long-chain organic material.

In certain embodiments of the first aspect of the present invention, in step (I.2), the contact time between the gas stream and the sheet surface is at most 2 minutes, in certain embodiments at most 1.5 minutes, in certain embodiments at most 1 minute, in certain embodiments at most 50 seconds, in certain embodiments at most 40 seconds, in certain embodiments at most 30 seconds, in certain embodiments at most 20 seconds, in certain embodiments at most 20 seconds, in certain embodiments at most 10 seconds.

In certain embodiments of the first aspect of the present invention, the sheet material is a glass sheet for a LCD substrate, a TV cover glass, a photovoltaic substrate or a substrate for other opto-electronic devices.

One or more embodiments of the present invention have one or more of the following advantages. First, by using a very small amount of long-chain organic materials, such as C18-OH, a non-continuous organic coating on a glass surface having a high effective surface protection function can be formed. Second, because no complex equipment is needed, the present invention can be carried out at low cost and can be retrofitted into existing glass production lines without significant modification of existing process and equipment. Third, the method of the present invention has the potential to eliminate the use of expensive plastic film in surface protection during glass transportation and storage. Fourth, the extremely low amount of surface coating material necessary for the protective effect according to the present invention means that the process can be carried out without significantly polluting the air of the working environment.

DETAILED DESCRIPTION

Figure 1:
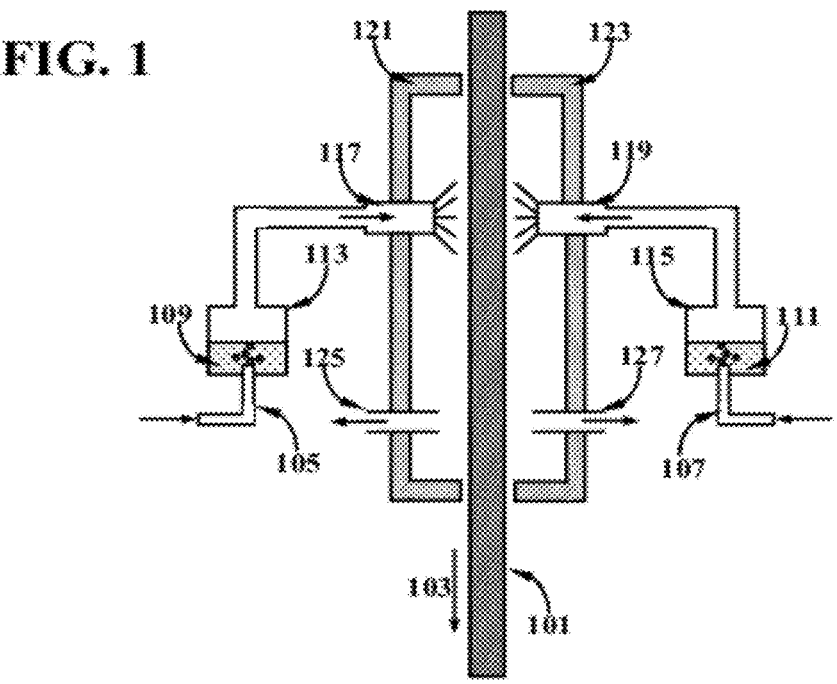
FIG. 1 is a schematic illustration of the equipment set-up in one embodiment of the present invention in operation to apply a layer of long-chain organic material onto the surface of a sheet material.

Unless otherwise indicated, all numbers such as those expressing weight percents and mole percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

As used herein, in describing and claiming the present invention, the use of the indefinite article "a" or "an" means "at least one," and should not be limited to "only one" unless explicitly indicated to the contrary. Thus, for example, reference to "a carbon chain" includes embodiments having one, two or more such carbon chains, unless the context clearly indicates otherwise.

As used herein, "in proximity to" means close to or at a particular location. Thus, a hydrophilic group in proximity to an end of a main carbon chain includes, e.g., (i) a hydrophilic group linked to the carbon atom at the very end of the main carbon chain; (ii) a hydrophilic group connected to a carbon atom that is directly linked to the carbon atom at the very end of the main carbon chain; and (iii) a hydrophilic group connected to a carbon atom that is spaced by less than 4 carbon atoms from the carbon atom at the very end of the main carbon chain.

As used herein, the term "Cn-OH" and "Cn-alcohol" are used interchangeably to mean an organic material the molecule of which comprises a straight chain having a number of carbon atoms of n and a hydroxyl group (—OH) at one end thereof. Thus, the term "C18-OH" and "C18-alcohol" are used interchangeably to mean an alcohol having a straight carbon chain comprising 18 carbon atoms and a hydroxyl at one end thereof. Accordingly, examples of C18-OH would include, but are not limited to: aliphatic alcohols such as octadecan-1-ol (F001), nonadecan-2-ol (F002), decadecan-3-ol (F003), 17-methyl-octadecan-1-ol (F004), 16-methyl-octadecan-ol (F005), 16-ethyl-octadecan-1-ol (F006), and the like. Chemical formula of these C18-OH are illustrated below:

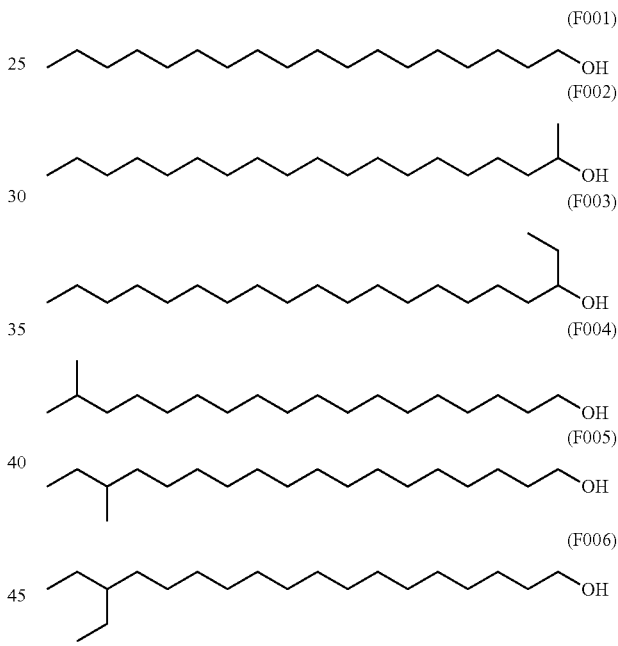

A straight chain alcohol means an alcohol the molecule of which does not comprise a pendant group other than OH. Thus, a straight chain C18-OH can be octadecan-1-ol (F001), nonadecan-2-ol (F002), decadedan-3-ol (F003), and the like. A primary alcohol typically means that in the molecule of the alcohol, the carbon atom connected with the OH group is not connected with more than one carbon atoms. A secondary alcohol means that in the molecule of the alcohol, the carbon atom connected with the OH group is connected with two carbon atoms, and a tertiary alcohol means that in the molecule of the alcohol, the carbon atom connected with the OH group is connected with three carbon atoms. Thus, (F002) and (F003) above are secondary alcohols.

Likewise, the term "Cn-COOH" and "Cn+1-acid" are used interchangeably to mean an organic material the molecule of which comprises a straight chain having a number of carbon atoms of n+1 (including the carbon atom in the —COOH group) and a carboxyl group (—COOH) at one end thereof. Thus, if the OH in a Cn-OH or Cn alcohol is replaced by a COOH group, it would then become a Cn-COOH or a Cn+1-acid. For example, if the —COH group in a C17-OH is converted into a —COOH group by, e.g., oxidation, it would become a C16-COOH, or alternatively, a C17-acid. It is known that at an elevated temperature such as around 100° C., straight chain C18-OH (F001) can be partially oxidized into C17-COOH or C18-acid (stearic acid).

As used herein, the term "discontinuous layer" means a layer of a material interspersed by a different material. Thus, a discontinuous layer of an organic material on a surface of a sheet material may exhibit one or more of the following topography, inter alia: (i) a plurality of discrete islets; (ii) a plurality of bands; (iii) a plurality of patches; and (iv) a plurality of mounds.

As used herein, the term "monolayer" means a layer of material that comprises a single layer of molecules. For example, a self-assembled single-molecule layer is a monolayer in the meaning of the present application. It should be noted, however, that in a monolayer, although in most locations the molecules of the materials align side-by-side, it is not ruled out that in a small percentage of areas, stacking of molecules having the thickness of several molecules may be present.

As used herein, the term "water contact angle" means water contact angle measured when the measured surface is placed substantially horizontally and the water drop footprint on the surface is substantially circular.

As used herein, the term "reduction of adhesion force" of a coated surface is measured and calculated as follows:

$$RAF = \frac{f(\max) - f(\min)}{f(\min)} \times 100\%,$$

where f(max) is the maximal adhesion force measured by atomic force microscope (AFM), f(min) is the minimal adhesion force measured by AFM under the same measurement condition, and RAF is reduction of adhesion force.

Many optical and/or electronic devices or the fabrication thereof require the use of an organic or inorganic material substrate having a surface with a high level of cleanliness and substantially free of scratches. For example, the fabrication of LCD displays and photovoltaics typically require the use of glass substrates having pristine surfaces substantially free of inorganic particles and scratches. Unfortunately, the production of such glass substrates typically require multiple steps of surface scoring, glass splitting, edge grinding and polishing, each of which could generate a large number of glass particles that can travel at a certain speed to impact the quality area of the glass surface. The flying particles can scratch the glass surface, leaving permanent damage, or adhere to the glass surface with a sufficiently strong bond that would survive subsequent washing and cleaning steps. Such residual glass particles on the glass surface can lead to defects in semiconductive devices such as transistors produced in downstream process. Thus, protecting the glass surface during glass cutting and edge finishing from glass particles and other contaminants is a technical challenge for substrate makers. In addition, sometimes a glass substrate needs to be shipped from a substrate fabrication factory to a substrate user at a different location. Normally, multiple glass sheets are packed into a container, which is then shipped from one location to another. While typically the glass containers are sealed, particles and other contaminants may nonetheless come into contact with the quality surface area, causing unwanted surface damage.

While organic materials such as polysaccharides, polyvinyl alcohol, polymeric acid and the like were proposed as coating materials to protect the quality surfaces of LCD glass substrates, they were in general applied at a thickness at least in the micrometer scale and typically would cover the entire quality surface. The presumed rationale for the high thickness and the full coverage of the glass surface was that a thin coating that fails to cover the entire glass surface would not be able to provide sufficient surface protection against scratches. However, while such thick coating suffices to provide surface protection, they pose significant challenges during washing and cleaning.

In a surprising discovery, the present inventors found that a very thin layer of long-chain organic materials having a thickness on the nano-meter scale could provide scratch-resistance to the pristine surfaces of glass substrates produced for use in LCD displays. Further study detailed below shows that not even a full surface coverage is required to achieve significant protective effect. Moreover, such a thin, sparsely applied coating material can be very easily removed in a regular surface washing and cleaning step, and thus can be used in an existing glass substrate manufacturing production line without significant modification of process and equipment set-up.

The surface protection method of the present invention can be used for any surface in need of protection, including organic and inorganic surfaces. However, the present invention would be particularly useful for protecting hydrophilic surfaces, such as those comprising hydrophilic surface groups, e.g., OH groups. A number of glass, glass-ceramic, ceramic and crystalline materials are known to comprise surface —OH groups and therefore can be advantageously protected by using the present invention. The present invention will be further illustrated in greater detail below in the context of protecting surfaces of oxide glass sheets. However, one having ordinary skill in the art should understand that, upon reading the specification of the present application, the present invention can be applied to protect other material surfaces, mutatis mutandis.

The hydrophilic group at the end or in proximity to the end of the main carbon chain of the long-chain organic material used in the process of the present invention can be a hydroxyl group (—OH), a carboxyl group (—COOH), an ether group, an amine group (—NH$_2$), an amide group (—CONH$_2$) or other groups. Without intending to be bound by a particular theory, it is believed the hydrophilic group of the long-chain organic material can react with the hydrophilic group on the surface of the sheet material to be protected to form a relatively strong bond. For example, where the sheet material has an oxide glass surface comprising surface —OH group, the surface —OH group could react with a —OH group of the organic material to form a covalent bond schematically illustrated below:

surface-O-carbon chain.

It is also possible that the molecules of the long-chain organic material may bond with the sheet surface through a hydrogen bond, van der Waals force or other mechanism.

The main chain of the organic material would then extend away from the surface of the glass surface. If a plurality of organic material molecules are applied to the glass surface and bonded to the surface in close proximity to one another, the organic material molecules can form relatively dense "forest-like" patches of the organic material on the surface. It is believed such patches of extending long carbon chains would function to reduce the frictional coefficient between particles (such as glass particles) and the glass surface, reduce the adhesion force between the glass particles and the glass surface, thereby protecting the glass surfaces from being scratched by the glass particles and reducing the number of glass particles that eventually bond to the glass surfaces with sufficient bonding strength to survive subsequent washing and cleaning Furthermore, modeling showed that increased surface roughness caused by discontinuous islets formed by the long-chain organic material is conducive to reduced surface adhesion to the glass particles. Therefore, because a full layer of coating of uniform thickness on the surface of the sheet surface may result in a low surface roughness, such uniform, full coating of the long-chain organic material could actually be less desirable than a discontinuous coating comprising a number of islets.

While a long-chain organic material having a single, straight carbon chain is particularly desirable for the present invention, it is possible to use a branched organic material having a plurality of long carbon chains.

Experiments detailed infra showed that for the long-chain organic material to confer meaningful protection to the glass surface, the number of carbon atoms in the longest carbon chain in the molecules thereof should be at least 12. This is due to several reasons. First, short-chain organic molecules tend to have relatively high volatility around room temperature and glass finishing and handling temperature, thereby reducing its effectiveness in surface protection. Second, the short-chain organic materials, especially alcohols, tend to be unstable in air under the coating and/or surface finishing conditions, leading to less than desired surface protection capabilities. However, organic materials comprising more than 40 carbon atoms tend to have too high a melting point, and/or too low a partial pressure under the glass sheet finishing/handling conditions, making using them very difficult. Organic materials comprising at most 30 carbons in the main chain would be easier to work with than those having 40 carbons. Example lengths of the main chain of the organic material would then include, but are not limited to: at most 28 carbon atoms, at most 26 carbon atoms, at most 24 carbon atoms, at most 22 carbon atoms, and at most 20 carbon atoms. In certain embodiments, it is particularly advantageous that the main chain comprises at least 16 carbon atoms, in certain embodiments at least 18 carbon atoms. For the purpose of the present invention, a 100% pure organic material is not necessary. Rather, a mixture of a variety of organic materials having a range of carbon atoms in their main chains may be advantageously used given its cost advantage over the pure material. In addition, different categories of organic materials with different hydrophilic groups may be used as well. For example, a mixture of long-chain aliphatic alcohol and a long-chain aliphatic acids can be advantageously used. Further, even if a pure starting coating material is used, it may still undergo certain chemical changes during application, such as oxidation, resulting in a mixture of organic material covering the glass sheet surface.

In certain particularly advantageous embodiments of the process according to the present invention, a long-chain alcohol or long-chain acid, or a mixture thereof, is used as the surface protecting agent. While other chain lengths may work in different embodiments, a C18-alcohol, especially a primary C18-alcohol, represents a particularly advantageous choice. This is because its melting point, flash point, stability in air, capability to form desired coating patterns on glass surfaces, removability, cost, all taken together, present a compromise that is more appealing than its alternatives. In another embodiment, a C18-acid may be used in combination with a C18-alcohol.

The density of the organic material upon application on the surface is desirably from 20 ng·cm$^{-2}$ to 160 ng·cm$^{-2}$, in certain embodiments from 30 ng·cm$^{-2}$ to 150 ng·cm$^{-2}$, in certain embodiments from 45 ng·cm$^{-2}$ to 140 ng·cm$^{-2}$, in certain embodiments from 40 ng·cm$^{-2}$ to 120 ng·cm$^{-2}$, in certain embodiments from 40 ng·cm$^{-2}$ to 100 ng·cm$^{-2}$. If the density is higher than 160 ng·cm$^{-2}$, the organic material may be difficult to remove at a later cleaning and washing step. If the density is lower than 20 ng·cm$^{-2}$, the organic material coating layer may be insufficient to provide the desired particle protection and scratch resistance.

When observed at a nanometer scale by atomic force microscopy (AFM), the thickness of the coating varies from one location to another. Without intending to be bound by a particular theory, it is believed this is due to the different stacking of the molecules of the organic material, the different average distances between adjacent molecules, the different degrees to which the molecules are straightened on the surface, the different manners in which the organic molecules assemble on the surface, and the different native surface roughness of the clean surface of the sheet material bearing the coating. Nonetheless, in order to apply the organic material in a sufficiently short period of time, and to achieve a high level of removability at a later cleaning step, it is desired that the organic material layer has a thickness as low as practical—all while maintaining a desired level of surface protection. Thus, the average thickness of the layer of the long-chain organic material at the end of step (I) is at most 10 nm, in certain embodiments at most 8 nm, in certain other embodiments at most 6 nm, in certain other embodiments at most 4 nm. In certain advantageous embodiments, the average thickness of the layer of the long-chain organic material on the clean surface is at most three times of the length of the main carbon chain. In certain embodiments, it is desired, and it is possible, that the molecules of the organic material form a mono-layer on the clean surface of the sheet material, i.e., without forming a stacked layer where one molecule is located above another. In the case of a primary C18-OH, the molecule thereof has a length in the range of 2-3 nm. Thus, it is desired that the average thickness of the organic material coating on the clean surface be in the range of 1-9 nm, in certain embodiments in the range of 1-7 nm, in certain other embodiments in the range of 1-6 nm, in certain other embodiments in the range of 1-4 nm, in certain other embodiments in the range of 1-3 nm. The reason why the lower limit of the coating thickness can be lower than the length of the straight chain of the alcohol is because, inter alia: (i) in certain areas of the surface to be protected, the alcohol molecules may be absent; and (ii) the molecules may not be all completely perpendicular to the glass surface, resulting in a thickness lower than a completely straightened molecular chain.

One interesting and significant finding in the research work by the present inventors is that the molecules of the organic material on the clean surface need not form a continuous layer covering the full range of the clean surface in order to confer a high degree of surface protection effect. This is counterintuitive in that traditional wisdom was that one needs to coat substantially the entire surface in order to achieve the best protective effect. The present inventors have found that, in certain embodiments, sufficient and significant surface protection effect has been achieved by forming a plurality of discontinuous islets of the organic material on the clean surface. In these embodiments, it is desired, however, that the distribution of the islets on the sheet surface to be protected be substantially uniform. Thus, it is desired that within any given 10 cm×10 cm area exposed to the organic material coating process having a density of islets of n islets·µm$^{-2}$, any 10 µm×10 µm tested area exhibits an islet density in the range from 0.80n to 1.20n. To achieve a sufficient level of surface protection, it is desired that the average distance between adjacent islets on the clean surface is in the range from 0.1 µm to 3 µm, in certain embodiments from 0.2 µm to 2.5 µm, in certain embodiments from 0.3 µm to 2.0 µm, in certain embodiments from 0.4 µm to 2.0 µm, in certain embodiments from 0.5 µm to 1.5 µm, in certain embodiments from 0.6 µm to 1.5 µm, in certain other embodiments from 1.0 µm to 1.5 µm.

Without intending to be bound by a particular theory, it is believed that because the bare sheet material surface areas between the islets is significantly smaller than the average particles that the sheet material is exposed to during typical finishing, packaging and transportation conditions such as in the case of glass sheet material, such particles would then primarily contact the organic material on the surface. The probability of a particle impacting a bare surface is reduced to very low, in certain embodiments to close to zero. Thus, a thin coating formed by a plurality of coating islets would function substantially the same as a full coating layer without any bare sheet material exposed in terms of surface protection effect. In addition, the flexibility of the organic material molecules on the glass surface and the low frictional coefficient of the organic material with respect to the impacting particles, would reduce the probability of particles adhering to or scratching the bare sheet material surface.

The thin protective coating layer applied to the clean surface of the glass sheet material can be advantageously deposited during and before the sheet material finishing process, as mentioned supra. Glass sheet materials are often subjected to finishing such as bead removal, surface scoring, bending and separation, as well as edge grinding and polishing. In each of these operations, a number of glass particles can be generated and scattered in all directions. Efforts have been made in the past to contain the particles and remove those particles by fluid streams to reduce contact thereof with the quality surface. Nonetheless, a significant amount of particles still make their way to the main surfaces of the glass sheets. The present invention can be advantageously used in connection with glass sheet finishing. Surface protecting layer formed during or before the finishing operation by using the present invention can advantageously protect the glass surface.

During the edge finishing step, such as that for glass sheets, water may be used to cool down the tools and the glass sheet, and/or to remove the glass particles. Thus, it is desired that the organic material can adhere to the sheet material surface with sufficient strength, such that the coating will not be unduly removed by the water used, and the surface protecting effect can be retained during the whole finishing operation.

The application of an organic material such as a long-chain alcohol or long-chain acid can increase the hydrophobicity of the coated surface as indicated by water contact angle. To achieve the desired level of surface protection, it is desired that at the end of step (I), the sheet surface bearing the long-chain organic material exhibits a water contact angle of from 12° to 50°, in certain embodiments from 12° to 45°, in certain embodiments from 15° to 40°, in certain embodiments from 20° to 40°, in certain embodiments from 30° to 40°. If the water contact angle is too small, the amount of the organic material applied to the sheet surface may be insufficient to confer the desired level of particle protection. If water contact angle is too large, the amount of the organic material may have been too large to be efficiently removed at a later cleaning step.

As mentioned supra, the long-chain organic material reduces the adhesion of particles to the sheet material surface. In certain particularly advantageous embodiments, at the end of step (I), the sheet surface, being an inorganic material surface, such as a glass surface, bearing the long-chain organic material exhibits a reduction of an adhesion force as measured by AFM of from 20% to 70%, in certain embodiments from 25% to 60%, in certain embodiments from 30% to 50%, in certain other embodiments from 30% to 40%. Such adhesion force is measured by an atomic force microscope (AFM) using a $Si_3N_4$ (the surface of which is oxidized to $SiO_2$ if exposed to air) measuring tip. This level of adhesion force is particularly desirable for reduced glass particle adhesion to a glass surface.

In certain embodiments, such as the handling of LCD glass substrates, it is desired that after the finishing operation, the glass substrate is washed and cleaned to remove the organic materials, any residual glass particles and other surface contaminants. Glass substrates used for LCD panel manufacture are required to have a high degree of cleanliness. Thanks to the nano-scale thickness of the organic material used in the present invention, the coating can be easily removed by using standard glass substrate cleaning agents, equipment and processes without the need of significant modification. Therefore, the present invention can be advantageously used to retrofit an existing glass production line. Upon cleaning, the substantially clean glass surface can exhibit a water contact angle from 0° to 10°, in certain embodiments form 0° to 8°, in certain embodiments form 0° to 6°, in certain embodiments form 0° to 5°, in certain embodiments form 0° to 3°.

The organic material used as the coating in the present invention can be applied by various means. For example, spray coating and dip coating are contemplated where the organic material is dispersed in a liquid media, such as a dispersant or a solvent, and the dispersion is applied to the sheet material surface by either spraying or dipping. In such embodiments, very low concentration of the organic material should be used in such dispersions in order not to form an overly thick coating on the glass surface. Further, a non-toxic solvent or liquid media, such as water, ethanol, acetone, or mixtures thereof, can be advantageously used.

Sometimes it is desirable to avoid the use of a liquid dispersant in the sheet material handling process. In such scenarios, the organic material can be advantageously applied by using a carrier gas stream. The long-chain organic material is first loaded into the glass stream, which is then delivered to the glass surface, contacts the glass surface for a sufficient period of time to effect the formation of the layer of the long-chain organic material. While the long-chain organic material may be present in solid, liquid or gas form in the carrier gas stream, it is advantageous the gas stream has a temperature higher than the melting point of the long-chain organic material such that the organic material is in liquid and/or gas state to avoid clogging of the channel containing the gas stream.

Loading of the long-chain organic material into the gas stream can be effected by various means. For example, the organic material, in substantially pure form, may be heated to a certain temperature where it is in liquid and/or solid state with sufficient vapor pressure. The vapor is then allowed to flow to the sheet surface to complete the coating material deposition. Alternatively, a gas stream may be allowed to bubble through a liquid bath comprising the long-chain organic material at a certain temperature, such as a melt or a solution, whereby the gas stream becomes entrained with the organic material, and then further delivered to the vicinity of the sheet surface, where at least part of the organic material condenses on the sheet surface and adheres to the surface to form a thin layer of coating thereon. For the purpose of producing sufficient vapor and to avoid clogging, it is advantageous to maintain the temperature of the gas stream to be at least 10° C. higher than the melting point of the long-chain organic material, in certain embodiments at least 20° C. higher than the melting point of the long-chain organic material; in certain other embodiments at least 30° C. higher than the melting point of the long-chain organic material. However, too high a temperature of the carrier gas stream can lead to disintegration, oxidation, reaction, burning or explosion of the long-chain organic material. Thus, the gas stream is advantageously maintained at a temperature not higher than 60° C. above the melting point, in certain embodiments not higher than 50° C. above the melting point.

FIG. 1 schematically illustrates an embodiment of the present invention where a primary C18-OH is applied to both major surfaces of a glass sheet 101 traveling in a direction 103 to achieve the surface protection effect. In this embodiment, air streams 105, 107 are passed into solutions 109, 111 of the C18-OH alcohol contained in vessels 109 and 111, and then delivered, through nozzles 117 and 119, to both major surfaces of the glass sheet. The nozzles are confined in enclosures 121 and 123 to prevent uncontrollable dissipation of the C18-OH. Effluent gas streams containing the residual C18-OH and optionally solvent are exhausted through outlet tubes 125 and 127 on the walls of the enclosures 121 and 123. The nozzles 117 and 119 desirably have a length spanning the full width of the glass sheet 101 so that the full quality area of the glass sheet is exposed to the gas streams loaded with the C18-OH molecules. One having ordinary skill in the art, upon reading the present disclosure and with the benefit of the teachings herein, should understand that the apparatus of FIG. 1 can be adapted for applying various other long-chain organic materials, to one side or both sides of the sheet, mutatis mutandis.

In order to obtain a layer of the long-chain organic material in solid state, it is desired that the sheet material such as glass is maintained at a temperature lower than the melting point of the long-chain organic material. If the temperature of the sheet material surface is too high, the organic material may be readily oxidized, or have too high a vapor pressure, leading to an insufficient coating with too low a density of the coating material or a layer of altered coating material that does not have the desired level of adhesion force, friction coefficient and hydrophobicity. Where air is used as the carrier gas, or the long-chain organic material is otherwise exposed to air, it is desired that the temperatures of the gas stream and the sheet material be maintained below the flash point for safety reasons.

In a particularly advantageous embodiment, in step (I), the organic material has a main carbon chain comprising at most 40 carbon atoms, in certain embodiments at most 30 carbon atoms, in certain embodiments at most 28 carbon atoms, in certain embodiments at most 26 carbon atoms, in certain embodiments at most 24 carbon atoms, in certain other embodiments at most 22 carbon atoms, and the temperature of the sheet material is maintained below 55° C., in certain embodiments below 50° C., in certain embodiments below 40° C.

The amount of the long-chain organic material deposited onto the sheet surface to be protected is determined by various factors, including, inter alia, the temperature of the carrier gas stream, the temperature of the sheet surface, the flow rate of the carrier gas stream, and the period of time the sheet surface is subject to contact with the carrier gas. An advantage of the present invention is, due to the small amount of coating material required, the coating process can be completed in a short period of time. This is particularly desirable for high-throughput glass finishing lines where the glass sheets are conveyed at a high speed. Thus, in certain embodiments of the present invention, in step (I.2), the contact time between the gas stream and the sheet surface is at most 2 minutes, in certain embodiments at most 1.5 minutes, in certain embodiments at most 1 minute, in certain embodiments at most 50 seconds, in certain embodiments at most 40 seconds, in certain embodiments at most 30 seconds, in certain embodiments at most 20 seconds, in certain embodiments at most 10 seconds.

The present invention is further illustrated by the following non-limiting examples.

EXAMPLES

Glass sheet samples were prepared from Eagle XG® LCD glass substrates made by Corning Incorporated, Corning, N.Y., U.S.A. using an overflow fusion down-draw process.

Figure 2:
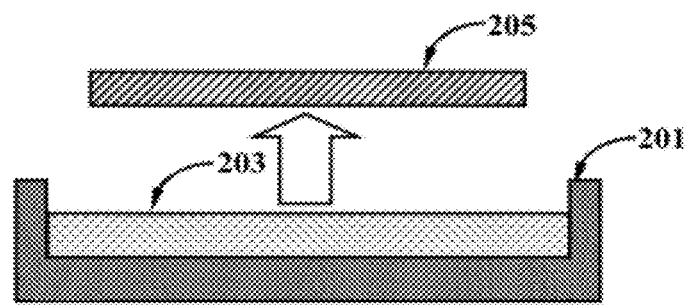
FIG. 2 is a schematic illustration of an experimental set-up used to form a coating of C18-OH on a glass surface.

FIG. 2 illustrates the apparatus set-up used in the experiments in the present disclosure. Into a glass Petri dish 201, solid octadecan-1-ol (Sigma Aldrich, Catalog #74723, 99% purity) was charged. The dish was then placed on a hot plate so that the C18-OH was heated to a temperature T1 in air where the alcohol melts to form a liquid 203 covering the full bottom surface of the dish 201. Vapor of the C18-OH was thus produced in the air immediately above the Petri dish 201 and would travel upwards due to diffusion and convection as illustrated by the arrow. A piece of glass sheet sample 205 having clean surfaces on both sides preheated to a temperature T2 was then placed over the dish 201 at a distance of about 1 cm from the surface of the melt of the alcohol where it is maintained for a period of time tt. The temperature of the alcohol is measured at the surface of the melt. Before being heated, the glass sheet sample 201 was measured for surface particle count PC1 using an Ethan system available from Accu_Fab Systems, U.S.A.

The glass sheet sample was then subjected to scratching test. Scratching took place by contacting a 380 g aluminum bar wrapped with a paper (WR139 from Thilmany, Wis., U.S.A.) with the surface of the glass sheet sample to be tested. The aluminum bar, without an external force normal to the glass surface other than gravity exerted thereto, was then moved relative to the glass sheet surface back and forth at a speed of 100 mm/s for 10 times. The glass sheet sample was then cleaned in a 4% Semiclean KG solution at 160° F. (71° C.) for 15 minutes and then air dried. The air dried surface was then measured for surface particle count PC2 using the Ethan system. An uncoated glass sheet sample was used as a control. A glass sheet sample protected with a plastic film (Visqueen®), was peeled off of the Visqueen® film, subjected to scratching as above, washed and the particle count determined, as another control, as indicated below.

Coated glass sheet sample surfaces were also measured by AFM for the surface topography and adhesion force. The measuring tip of the AFM was made of $Si_3N_4$, the surface of which is believed to have been oxidized into $SiO_2$ due to exposure to air.

A series of experiments were carried out under various coating conditions (T1, T2 and tt). The measured PC1 and PC2 in different experiments are reported in TABLES I and II, below. Experiment Nos. A1, A2, AA1 and AA2 are control experiments in that the surface measured for particle counts were not subjected to coating with the organic material. These experiment data show that the peak particle reduction performances were observed at T1=80° C. and tt=10 seconds, and T2=90° C. and tt=10 seconds. At 90° C., the particle reduction performance was reduced when the coating time was reduced from 10 seconds to 5 seconds. Raising T1 to above 90° C. did not result in appreciable particle reduction performance change. On the other hand, prolonging the coating time to over 60 seconds and longer at 80° C. or higher did not result in appreciable particle reduction performance change, either. Thus, for octadecan-1-ol, the optimized coating condition would be about T1=80° C. and tt=10 seconds. In general, for the sake of convenience, cost and safety of the process, it is desired that the coating temperature T1 be low and coating time tt be short, as long as the desired level of surface protection effect is achieved.

TABLE I

| Experiment No. | Condition | | PC1 ($cm^{-2}$) | PC2 ($cm^{-2}$) | PC2 − PC1 ($cm^{-2}$) |
|---|---|---|---|---|---|
| | T1 (° C.) | tt (second) | | | |
| A1 | N/A | N/A | 21.89 | 182.09 | 160.20 |
| A2 | N/A | N/A | 5.96 | 51.03 | 45.07 |
| B1 | 50 | 5 | 7.31 | 55.08 | 47.77 |
| B2 | 50 | 5 | 4.26 | 52.49 | 48.23 |
| C1 | 50 | 10 | 4.96 | 41.47 | 36.51 |
| C2 | 50 | 10 | 3.75 | 46.40 | 42.65 |
| D1 | 60 | 5 | 12.35 | 34.88 | 22.53 |
| D2 | 60 | 5 | 4.39 | 67.25 | 62.86 |
| E1 | 60 | 10 | 5.00 | 79.31 | 74.31 |
| E2 | 60 | 10 | 8.01 | 51.52 | 43.51 |
| F1 | 70 | 5 | 7.55 | 86.04 | 78.49 |
| F2 | 70 | 5 | 8.61 | 50.25 | 41.64 |
| G1 | 70 | 10 | 8.14 | 36.31 | 28.17 |
| G2 | 70 | 10 | 5.65 | 28.73 | 23.08 |
| H1 | 80 | 5 | 4.42 | 22.14 | 17.72 |
| H2 | 80 | 5 | 4.83 | 26.84 | 22.01 |
| I1 | 80 | 10 | 5.41 | 7.31 | 1.90 |
| I2 | 80 | 10 | 6.20 | 9.70 | 3.50 |
| J1 | 90 | 5 | 12.13 | 43.02 | 30.89 |
| J2 | 90 | 5 | 4.15 | 22.34 | 18.19 |
| K1 | 90 | 10 | 5.87 | 6.11 | 0.24 |
| K2 | 90 | 10 | 4.87 | 6.27 | 1.40 |
| L1 | VQ peel | N/A | N/A | 13.98 | N/A |
| L2 | VQ peel | N/A | N/A | 77.90 | N/A |

TABLE II

| Experiment No. | Condition | | PC1 ($cm^{-2}$) | PC2 ($cm^{-2}$) | PC2 − PC1 ($cm^{-2}$) |
|---|---|---|---|---|---|
| | T1 (° C.) | tt (seconds) | | | |
| AA1 | No coating | N/A | 10.14 | 126.12 | 115.98 |
| AA2 | No coating | N/A | 18.12 | 55.16 | 37.04 |
| AC1 | 80 | 60 | 14.18 | 10.23 | −3.95 |
| AC2 | 80 | 60 | 10.77 | 7.79 | −2.98 |
| AD1 | 80 | 300 | 18.15 | 12.98 | −5.17 |
| AD2 | 80 | 300 | 12.31 | 19.59 | 7.28 |
| AE1 | 80 | 600 | 17.77 | 13.43 | −4.34 |
| AE2 | 80 | 600 | 19.24 | 19.60 | 0.36 |
| AF1 | 90 | 60 | 20.34 | 13.08 | −7.26 |
| AF2 | 90 | 60 | 22.61 | 8.17 | −14.44 |
| AG1 | 90 | 300 | 19.16 | 17.09 | −2.07 |
| AG2 | 90 | 300 | 15.53 | 12.93 | −2.60 |
| AH1 | 90 | 600 | 17.61 | 19.38 | 1.77 |
| AH2 | 90 | 600 | 19.72 | 8.63 | −11.09 |
| AI1 | 100 | 10 | 15.88 | 32.81 | 16.93 |
| AI2 | 100 | 10 | 7.73 | 12.01 | 4.28 |
| AJ1 | 100 | 60 | 12.29 | 5.57 | −6.72 |
| AJ2 | 100 | 60 | 7.56 | 6.62 | −0.94 |
| AK1 | 100 | 300 | 9.18 | 7.45 | −1.73 |
| AK2 | 100 | 300 | 8.91 | 15.41 | 6.50 |
| AL1 | 100 | 600 | 13.17 | 20.65 | 7.48 |
| AL2 | 100 | 600 | 18.56 | 10.93 | −7.63 |
| AM1 | VQ Peel | N/A | N/A | 7.38 | N/A |
| AM2 | VQ Peel | N/A | N/A | 18.00 | N/A |

Figure 3:
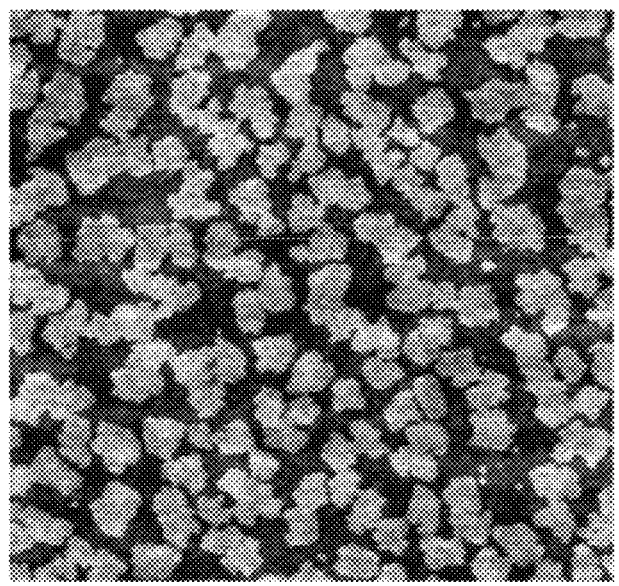
FIG. 3 is an AFM image of a 10 μm×10 μm area of the surface of a piece of glass sheet that has been applied a layer of C18-OH thereto according to one embodiment of the present invention.
Figure 4:
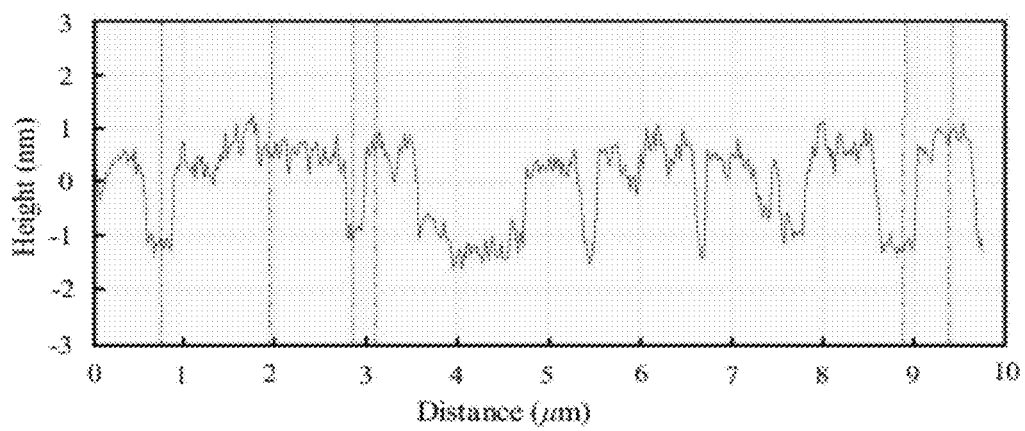
FIG. 4 is a diagram showing thickness profile of the C18-OH layer shown in FIG. 3 as measured by AFM along a selected straight line in the AFM image.

FIG. 3 shows surface topography image captured by AFM on a 10 μm×10 μm scale of a surface of a glass sheet sample made of Eagle XG® having octadecan-1-ol deposited thereon in an experiment where T1=90° C., T2=room temperature, and tt=10 seconds. In this image, the lighter areas are those bearing larger amount of C18-OH coating, and the darker areas bear relatively smaller or no C18-OH coating, and the darkest areas are believed to be essentially free of C18-OH molecules because the surface adhesion force as measured in these areas by AFM is substantially the same as that of a bare glass sheet surface that had not been exposed to C18-OH vapor. Clearly discontinuous islets of C18-OH molecules were formed on the glass surface. FIG. 4 further illustrates the surface roughness of the same area shown in FIG. 3 along a horizontal line chosen in the image of FIG. 3. In FIG. 4, the horizontal axis represents distance from one edge of the measured area; and the vertical axis shows the measured surface height relative to a reference plane. FIGS. 3 and 4 show that vapor deposition resulted in mounds of octadecanol about 1-2 nm high and fairly regularly spaced, the deposited particle sizes are generally less than 1 μm as indicated by the light regions in FIG. 3.

Figure 5:
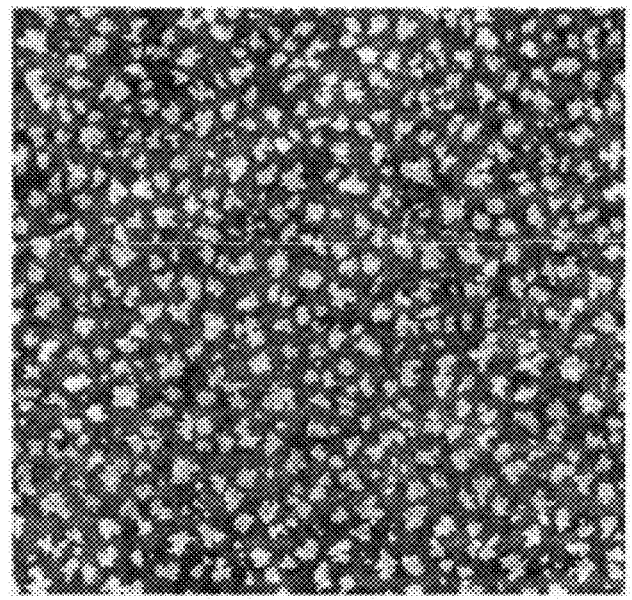
FIG. 5 is an AFM image of a 10 μm×10 μm area of the surface of a piece of glass sheet that has been applied a layer of C18-OH thereto according to another embodiment of the present invention.
Figure 6:
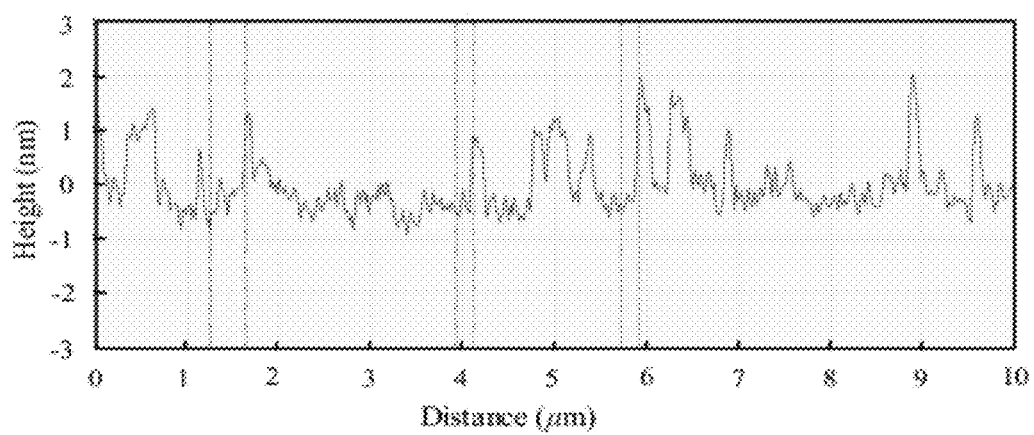
FIG. 6 is a diagram showing thickness profile of the C18-OH layer shown in FIG. 5 as measured by AFM along a selected straight line in the AFM image.

FIG. 5 shows surface topography image captured by AFM on a 10 μm×10 μm scale of a surface of another glass sheet sample made of Eagle XG® having octadecan-1-ol deposited thereon in an experiment where T1=80° C., T2=room temperature, and tt=10 seconds. Again, in this image, the lighter areas are those bearing larger amount of C18-OH coating, and the darker areas bear relatively smaller or no C18-OH coating, and the darkest areas are believed to be essentially free of C18-OH molecules because the surface adhesion force as measured in these areas by AFM is substantially the same as that of a bare glass sheet surface that had not been exposed to C18-OH vapor. Clearly discontinuous islets of C18-OH molecules were formed on the glass surface. FIG. 6 further illustrates the surface roughness of the same area shown in FIG. 5 along a horizontal line chosen in the image of FIG. 5. In FIG. 6, the horizontal axis represents distance from one edge of the measured area; and the vertical axis shows the measured surface height relative to a reference plane. FIGS. 5 and 6 again show that vapor deposition resulted in mounds of octadecan-1-ol about 1-2 nm high and fairly regularly spaced, the deposited particle sizes are generally less than 1 μm as indicated by the light regions in FIG. 5. Comparison of FIG. 3 with FIG. 5 shows that smaller, but larger number of islets were formed at 80° C. than at 90° C.

Figure 7:
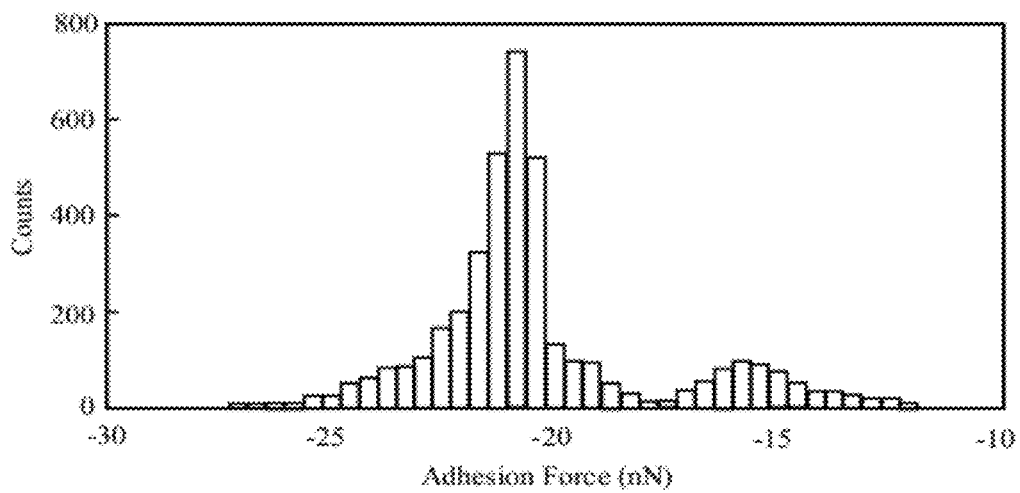
FIG. 7 is a diagram showing distribution of adhesion force as measured by AFM of the surface area of the glass sheet as shown in FIG. 3.
Figure 8:
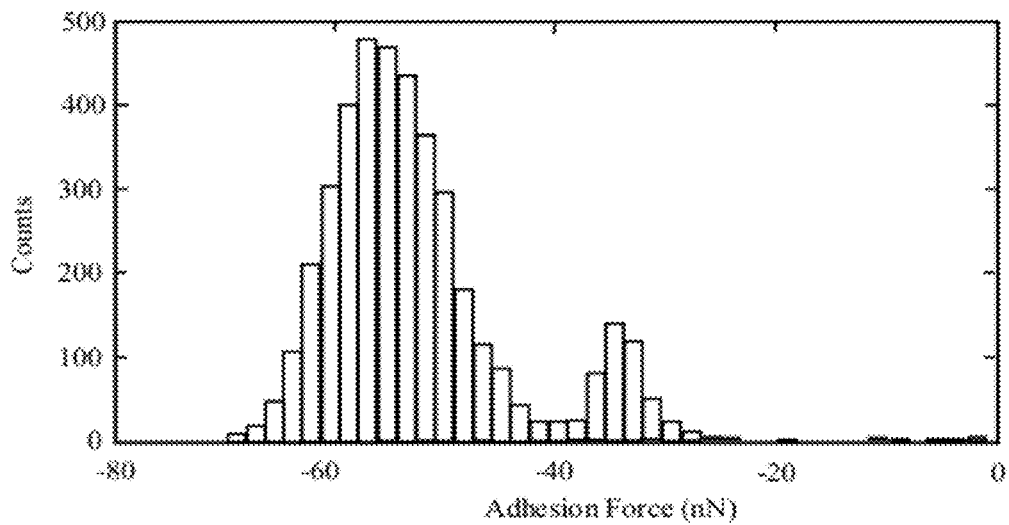
FIG. 8 is a diagram showing distribution of adhesion force as measured by AFM of the surface area of the glass sheet as shown in FIG. 5.

Retraction force of the glass sheet surface as measured by AFM was then recorded as adhesion force of the sample surface. Adhesion force profiles of the two coated samples of FIGS. 3 and 5 are provided in FIGS. 7 and 8, respectively. In these two figures, shown on the horizontal axes are measured adhesion force in nano Newton, and shown on the vertical axes are measured counts at a given adhesion force.

The coated glass sheet sample was also measured for water surface contact angle. Finally, the glass sheet sample was cleaned by using 160° F. (71° C.) 4% Semiclean KG for 15 minutes followed by deionized water rinsing. Upon air drying, the glass sheet sample was measured for contact angle again at room temperature.

A comparison of FIGS. 3, 4, 5 and 6 show that the width of the deposited islets on the glass sheet surface decreases as the temperature of the C18-OH melt decreases, as expected. The lighter, coated regions in FIGS. 3 and 5 show lower adhesion forces (retraction forces) than the darkest regions which are believed to be bare glass surfaces, by about 30%-40%, clearly indicating that octadecan-1-ol, as deposited, provides a benefit in terms of a reduction in glass adhesion. The reduced surface adhesion force will translate into less adhesion of glass particles to the glass sheet surface.

In experiments, the surface of a control glass sheet samples were subjected to contact with a plastic film, Visqueen®, first. After the Visqueen® film was peeled off, the contacted surface was measured by AFM in the same manner as for the C18-OH coated glass sheet surface. It was observed that contact of the glass surface with Visqueen® film also left a discontinuous layer of organic materials, which are believed to be a mixture of additives contained in the plastic film, including, but not limited to, slip agents, plasticizing agent, and the like. No long chain alcohols were discovered therein. Experiments L1, L2 in TABLE I and experiments AM1 and AM2 in TABLE II involve surface protection using Visqueen® film. It was further observed that the adhesion force in the area covered by the residual organic material left by the peeled Visqueen® film was reduced by from 10% to nearly 50% compared to the bare glass surface regions. However, the distribution of the residual organic material on the glass surface was highly irregular, leaving certain large areas not covered, and certain areas covered with significantly larger islands than observed in FIGS. 3 and 5, supra. Therefore, it is expected that the residual organic material left by the contact with a Visqueen® film would not function as well as the organic layer deposited by using the method of the present invention. In addition, the use of Visqueen® or other plastic film would necessarily incur the cost of the film, the film application equipment, film application and peeling steps, and therefore would be much more expensive than the method of the present invention. Furthermore, the use of a plastic film can introduce other organic contaminants and inorganic particles to the glass surface per se. The method of the present invention would therefore not have these drawbacks.

The glass sheet samples were also measured for horizontal water contact angles (i.e., water contact angles measured when the glass sheet samples were placed horizontally instead of vertically). TABLE III below reports water contact angle data for Eagle XG® upon being coated with octadecan-1-ol according to embodiments of the method of the present invention, or after being washed with Semiclean® KG. The reduction of contact angle upon washing indicates that clean glass values are achieved. Clean glass water surface contact angle values are on the order of 5-10°. Washability of the C18-OH coating formed in the experiments was also measurable and demonstrated by ESI/MS (Electrospray Ionization/Mass Spectroscopy). ESI/MS data showed that no residual organic material remained after normal cleaning using Semiclean® KG as described supra. Data Ware water contact angles of the glass sheet sample surface measured at room temperature immediately upon being coated with the long-chain organic material. Data θ2 are water contact angles of the glass sheet sample surface upon being cleaned as described above measured at room temperature. Data θ3 are measured water contact angles at room temperature of the same cleaned glass sheet sample surface two days after θ2 was measured.

TABLE III

| Experiment No. | T1 (° C.) | θ1 (°) | θ2 (°) | θ3 (°) |
|---|---|---|---|---|
| AB1 | 60 | 20.9 | 8.1 | 13.1 |
| AB2 | 70 | 26.6 | 8.4 | 17.5 |
| AB3 | 80 | 29.5 | 7.9 | 15 |
| AB4 | 90 | 34.1 | 4.6 | 8.4 |
| AB5 | 100 | 36.4 | 5.4 | 10.8 |

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A method of handling a glass sheet material having a sheet surface comprising the following steps:
   (I) forming a discontinuous layer of a long-chain organic material having a main carbon chain comprising at least 12 carbon atoms and a hydrophilic group and
   (II) exposing the sheet surface bearing the long-chain organic material to a plurality of traveling particles;
   wherein in step (I), the organic material has a main carbon chain comprising a hydrophilic group selected from a hydroxyl and a carboxyl group.

2. A method according to claim 1, wherein the sheet surface of the glass sheet material is hydrophilic.

3. A method according to claim 1, wherein in step (I), the organic material has a main carbon chain comprising at most 40 carbon atoms.

4. A method according to claim 1, wherein in step (I), the organic material is selected from C18-OH and mixtures of C18-OH and C18-acid.

5. A method according to claim 1, wherein the density of the long-chain organic material at the end of step (I) is from 20 ng·cm$^{-2}$ to 160 ng·cm$^{-2}$.

6. A method according to claim 1, wherein the average thickness of the layer of the long-chain organic material at the end of step (I) is at most 10 nm.

7. A method according to claim 1, wherein the average thickness of the layer of the long-chain organic material on the sheet surface is at most three times of the length of the main carbon chain.

8. A method according to claim 1, wherein the molecules of the long-chain organic material form a plurality of discontinuous islets on the sheet surface.

9. A method according to claim 1, wherein the islets are separated by non-coated bare surface area of the sheet surface.

10. A method according to claim 1, wherein the average distance between adjacent islets on the sheet surface is from 0.1 μm to 3 μm.

11. A method according to claim 1, wherein step (II) comprises:
(II.1) grinding an edge of the glass sheet material.

12. A method according to claim 1, wherein step (II) further comprises:
(II.2) applying water to the edge of the glass sheet material.

13. A method according to claim 1, wherein step (II) comprises:
(II.3) scribing part of the sheet surface of the glass sheet material to form a score-line; and
(II.4) separating a part of the glass sheet material along the score-line from the glass sheet material.

14. A method according to claim 1, wherein at the end of step (I), the sheet surface bearing the long-chain organic material exhibits a water contact angle of from 12° to 50°.

15. A method according to claim 1, wherein at the end of step (I), the sheet surface bearing the long-chain organic material exhibits a reduction of adhesion force as measured by AFM of from 20% to 70%.

16. A method according to claim 1, wherein in step (I), the temperature of the glass sheet material is maintained below the melting point of the long-chain organic material.

17. A method of handling a glass sheet material having a sheet surface comprising the following steps:
(I) forming a discontinuous layer of a long-chain organic material having a main carbon chain comprising at least 12 carbon atoms and a hydrophilic group and
(II) exposing the sheet surface bearing the long-chain organic material to a plurality of traveling particles, wherein step (I) comprises:
(I.1) providing a gas stream comprising the long-chain organic material; and
(I.2) contacting the gas stream with the sheet surface for a sufficient period of time to effect the forming of the layer of the long-chain organic material.

18. A method according to claim 17, wherein in step (I.2), the gas stream has a temperature higher than the melting point of the long-chain organic material, but below the flash point of the long-chain organic material.

19. A method of handling a glass sheet material having a sheet surface comprising the following steps:
(I) forming a discontinuous layer of a long-chain organic material having a main carbon chain comprising at least 12 carbon atoms and a hydrophilic group and
(II) exposing the sheet surface bearing the long-chain organic material to a plurality of traveling particles, wherein step (I.1) comprises:
(I.1.1) forming a liquid comprising the long-chain organic material; and
(I.1.2) passing a carrier gas stream through the liquid or in the vicinity of the surface of the liquid to load the gas stream with the long-chain organic material.

\* \* \* \* \*